(12) United States Patent
Allen et al.

(10) Patent No.: US 10,377,917 B2
(45) Date of Patent: Aug. 13, 2019

(54) PROCESS FOR PREPARING A COATING

(71) Applicants: Warrick Allen, Hilversum (NL); Ileana Nedelcu, Nieuwegein (NL)

(72) Inventors: Warrick Allen, Hilversum (NL); Ileana Nedelcu, Nieuwegein (NL)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/221,130

(22) Filed: Jul. 27, 2016

(65) Prior Publication Data

US 2017/0029661 A1    Feb. 2, 2017

(30) Foreign Application Priority Data

Jul. 27, 2015  (GB) .................................. 1513165.9
Jul. 27, 2015  (GB) .................................. 1513166.7

(51) Int. Cl.

| | |
|---|---|
| *C08G 18/62* | (2006.01) |
| *C08G 18/79* | (2006.01) |
| *C09D 175/16* | (2006.01) |
| *C10M 107/44* | (2006.01) |
| *C10N 50/02* | (2006.01) |

(52) U.S. Cl.
CPC ....... *C09D 175/16* (2013.01); *C08G 18/6216* (2013.01); *C08G 18/792* (2013.01); *C10M 107/44* (2013.01); *C10M 2217/0453* (2013.01); *C10M 2229/041* (2013.01); *C10N 2050/02* (2013.01); *C10N 2230/06* (2013.01); *C10N 2250/121* (2013.01)

(58) Field of Classification Search
None
See application file for complete search history.

(56) References Cited

U.S. PATENT DOCUMENTS

| | | | |
|---|---|---|---|
| 5,674,567 A | 10/1997 | Kausch et al. | |
| 6,139,261 A | 10/2000 | Bishop | |
| 2004/0121162 A1* | 6/2004 | Yamaoka | C08G 18/3271 428/425.8 |
| 2012/0201982 A1* | 8/2012 | Stewart | C03C 17/322 428/34.4 |

(Continued)

FOREIGN PATENT DOCUMENTS

| | | |
|---|---|---|
| CN | 104293158 A | 1/2015 |
| EP | 1106878 A2 | 6/2001 |

(Continued)

*Primary Examiner* — Vishal V Vasisth
(74) *Attorney, Agent, or Firm* — Bryan Peckjian; SKF USA Inc. Patent Dept.

(57) ABSTRACT

A process for preparing a coating on at least part of a tribological surface of a first machine component which, during machine operation, is adapted to be in sliding contact with a tribological surface of a second machine component is provided. The process provides the steps of: (a) applying a polymer formulation onto at least part of the tribological surface of the first machine component to form a coating. The polymer formulation provides an isocyanate that contains two or more isocyanate groups per molecule and an idocyanate-reactive polyol to form polyurethanes; and (b) subjecting at least part of the coating as obtained in step (a) to a curing treatment during which polyurethanes are formed in the coating on the at least part of the tribological surface of the first machine component.

20 Claims, 3 Drawing Sheets

(56) References Cited

U.S. PATENT DOCUMENTS

2012/0302471 A1   11/2012  Webb
2013/0006175 A1*   1/2013  Elton ................... A61L 29/085
                                                    604/96.01
2014/0329729 A1*  11/2014  Becker-Willinger .......................
                                                       C09D 5/027
                                                          508/106

FOREIGN PATENT DOCUMENTS

| JP | S55157660 A | 12/1980 |
| KR | 20130043282 A | 4/2013 |
| KR | 20140135040 A | 11/2014 |

* cited by examiner

PROCESS FOR PREPARING A COATING

CROSS REFERENCE TO RELATED APPLICATIONS

This application claims priority to Great Britain patent application no. 1513166.7 filed on Jul. 27, 2015 and to Great Britain patent application no. 1513165.9 filed on Jul. 27, 2015, the contents of which are fully incorporated herein by reference.

FIELD OF THE INVENTION

The present invention relates to a process for preparing a coating on at least part of a tribological surface of a first machine component which, during machine operation, is adapted to be in sliding contact with a tribological surface of a second machine component; a machine component obtainable by the present process; and (ii) the use of a protective coatings as prepared in the present process for reducing friction between the first machine component and the second machine component that is in sliding contact with the first machine component.

BACKGROUND OF THE INVENTION

In applications where sliding contact occurs between the tribological surfaces of two machine components, such as in plain bearing arrangements and dynamic sealing arrangements, friction and heat are necessarily generated. This can lead to fretting and wear and accelerated failure of a component of the bearing arrangement or sealing arrangement. One way of reducing friction is to lubricate the tribological surfaces with an oil or grease, such that an oil film develops therebetween. A disadvantage of such lubrication is the fact that the oil film is not present upon start-up and that formation of the lubricating layer only occurs when a particular temperature has been reached.

Therefore, in addition to or instead of using a lubricant, it can be beneficial to apply a low-friction coating to the tribological surface of a machine component that is in sliding contact with another surface. An example of a bushing assembly comprising an anti-friction layer is disclosed in U.S. Pat. No. 6,139,261. The bushing assembly supports a torque shaft relative to a housing and provides a bushing mounted to the housing and a wear sleeve mounted to the shaft. A radially inner surface of the bushing is provided with a PTFE coating of 10-20 mm thickness.

It is also known to use low-friction coatings in dynamic sealing applications, for example, from EP1106878. A seal for a rolling element bearing is described, which has an elastomeric sealing element comprising a contact lip that bears against a counterface on an inner ring of the bearing. A sealing surface of the lip is provided with a PFTE coating having a thickness of less than 0.2 mm.

PTFE has excellent low-friction properties, but is a soft material and can be difficult to apply in a durable manner.

It would be an advantageous object of the invention to provide a machine component which displays low friction when in sliding contact with a counter surface of another machine component, by means of a coating that mitigates at least some of the disadvantages associated with prior-art solutions.

BRIEF SUMMARY OF THE INVENTION

It has now been found that this object can be realized when use is made of a particular coating which is applied on a machine component such as for instance a seal.

Accordingly, the present invention relates to process for preparing a coating on at least part of a tribological surface of a machine component which, during machine operation, is adapted to be in sliding contact with a tribological surface of a second machine component, which process provides the steps of:

(a) applying a polymer formulation onto at least part of the tribological surface of the first machine component to form a coating, which polymer formulation provides an isocyanate that contains two or more isocyanate groups per molecule and an isocyanate-reactive polyol to form polyurethanes; and (b) subjecting at least part of the coating as obtained in step (a) to a curing treatment during which polyurethanes are formed in the coating on the at least part of the tribological surface of the first machine component.

In addition, the present invention also relates to a machine component obtainable by the process according to the present invention.

Moreover, the present invention relates to a first machine component on which a coating is formed using a process according to the present invention.

Further, the present invention also relates to the use of a coating as prepared in a process according to the present invention for reducing friction between the first machine component and the second machine component that is in sliding contact with the first machine component.

The present invention also relates to a machine comprising a first machine component on which a coating is formed using a process according to the present invention and a second component which is in sliding contact with the first machine component.

The machine in accordance with the present is suitably an enclosed machine in which the first machine and second machine component are not exposed to external conditions such as weather conditions.

In one embodiment the first and second machine components form part of a dynamic sealing assembly comprising a dynamic seal having a contact lip that bears against a counterface. The counterface can be a surface of a shaft, or of a part fixedly mounted to the shaft such as a flinger or a bearing inner ring, that is rotational relative to the seal. In a further example, the counterface is a surface of a cylinder housing or piston that is linearly displaceable relative to the seal. The coating may be provided on a contact surface of the seal lip and/or on the counterface.

The dynamic seal may thus be used to seal passages between machine components that move relative to each other, either linearly or in the circumferential direction. The dynamic seal may be, for example, a lip seal of a rolling element bearing, an engine seal (such as, for example, a valve stem seal, a crankshaft seal or a shaft seal), an O-ring seal, a steering seal, a suspension seal, a piston seal, a wheel end seal, a power transmission seal, a pneumatic seal, a hydraulic seal, a fluid handing seal or an aerospace shaft seal.

In a further embodiment, the first and second machine components form part of a plain bearing assembly. In one example, the plain bearing assembly is a radial assembly comprising oppositely oriented radial surfaces in sliding contact with each other, for supporting and transmitting radial loads. One of the first and second components is an inner component, such as a shaft, or a part fixedly mounted to the shaft such as a sleeve, bushing or the inner ring of a plain bearing. The other of the first and second components is an outer component, such as a housing or a part that is fixedly mounted to the housing, such as the outer ring of a plain bearing or a sleeve or bushing. The coating may be provided on a radially outer surface of the inner component and/or on a radially inner surface of the outer component. In a further example, the plain bearing assembly is a thrust bearing assembly comprising oppositely oriented axial surfaces in sliding contact with each other, whereby the coating is provided on one or both axial surfaces.

In accordance with the present invention a new approach is provided to combat the effects of wear and fretting on machine components such as plain bearings, seals and bushings, and which deals with the disadvantages discussed above. In particular, the present invention provides a machine component for use in bearing and seal applications, wherein a tribological surface of the component is provided with a coating in which polyurethanes have been formed. Hence, a protective coating is already present before operating the bearing and the seal, resulting in an improved fatigue life of the bearing and seal.

The invention will now be described in more detail and with reference to examples and the accompanying drawings.

DETAILED DESCRIPTION OF THE INVENTION

Figure 1:
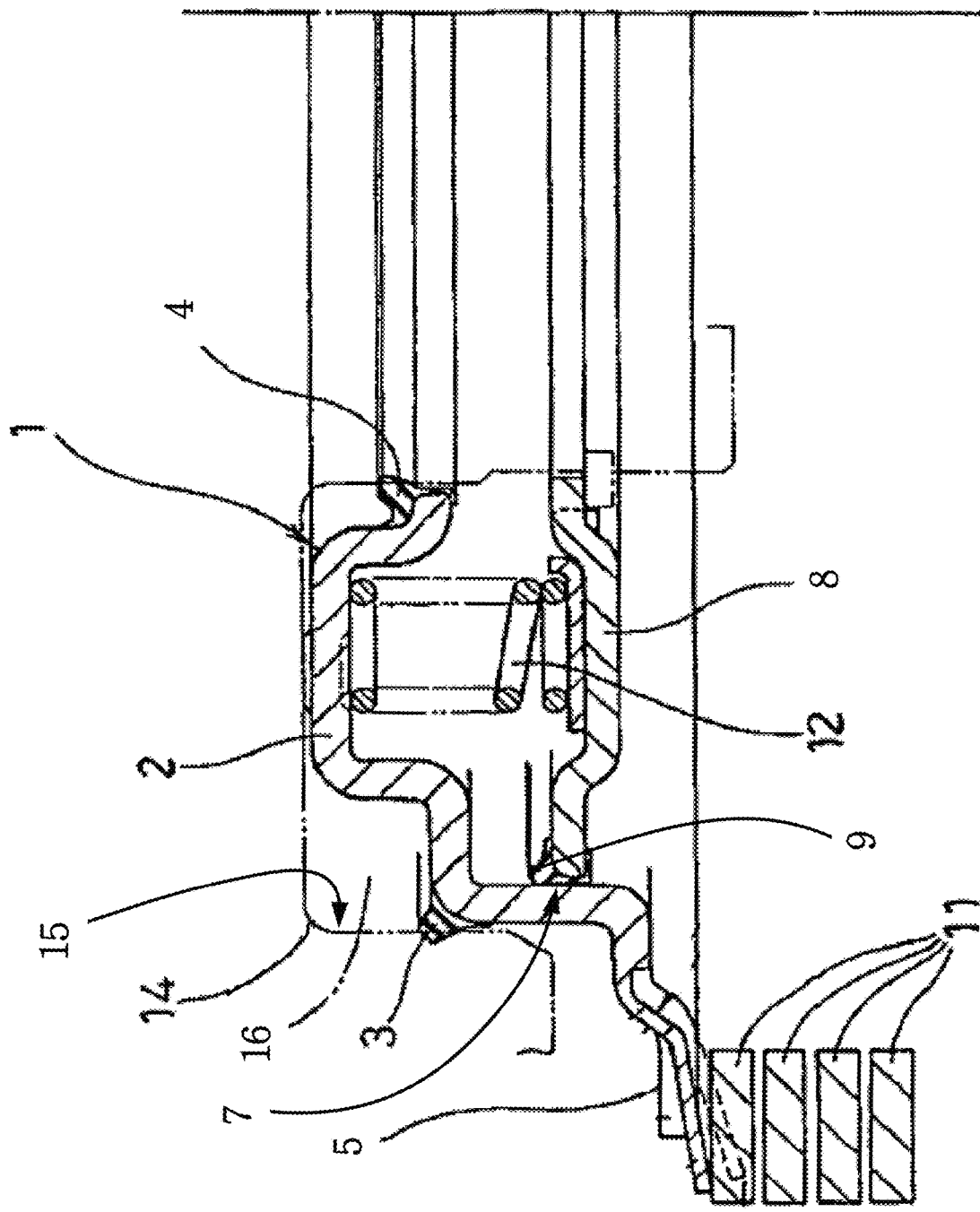
FIG. 1 is a part cross-sectional view of an example of bonded piston seal provided with a coating in accordance with the invention.

In accordance with the present invention a coating is prepared on at least part of a tribological surface of a first machine component which, during machine operation, is adapted to be in sliding contact with a tribological surface of a second machine component.

The first machine component can be derived from an elastomeric material or it can be derived from a non-elastomeric material.

When the first machine component is derived from an elastomeric material, the elastomeric material to be used is suitably selected from the group consisting of NBR (nitrile butadiene rubber), SBR styrene butadiene rubber), CR (chloroprene rubber), HNBR (hydrogenated nitrile butadiene rubber), XNBR (carboxylated nitrile butadiene rubber), EPM (ethylene propylene rubber), EPDM (ethylene propylene dienbutade monomer), IIR (polyisobutylene rubber), FUR (polyurethane rubber), AEM (ethylene acylic rubber), ACM (polyacrylate rubber), ABR (acrylate butadiene rubber), FKM (fluorocarbon rubber), FFKM (perfluoro rubber), SI (silicon rubber), VMQ (silicone rubber), Q (silicon rubber), EVA (ethylene vinyl acetate) and TPE (thermoplastic elastomer). Preferably the elastomeric material provides FKM, NBR, ACM or AEM. More preferably, the elastomeric material provides NBR or FKM. Most preferably, the elastomeric material provides FKM.

When the first machine component is derived from a non-elastomeric material, the non-elastomeric material to be used is suitably selected from the group consisting of ceramic materials, chrome steels, stainless steels and carbon alloy steels. Examples of suitable ceramic materials include zirconia and aluminium oxides, silicon carbide, boron nitride, and in particular silicon nitrides—Examples of suitable stainless steels include martensitic grades such as 410 and 410H, austenitic grades such as 304 and 316, ferritic grades such as 410S, duplex grades such as 2205 and precipitation hardened grades such as 17-4 PH. Examples of carbon alloy steels include 1060 and A36. Preferably, the non-elastomeric material provides steel.

In step (a), an aqueous polymer formulation is applied onto at least part of the tribological surface of the first machine component to form a coating. The aqueous polymer formulation can be applied onto the whole tribological surface of the first component. An advantage of the present invention is that it is also possible to apply the polymer formulation only on that part of the tribological surface of the first machine component where the coating is needed, instead that the complete first machine component is covered with a coating which is usually the case when use is made of for instance a vapor deposition technique.

In accordance with the present invention, in step (a) the polymer formulation can suitably be applied onto at least part of the tribological surface of the first machine component by means of a dip coating, contact coating, roller coating or spray coating process. The polymer formulation is preferably applied onto at least part of the tribological surface of the first machine component by means of spray, spin or dip coating process or a combination of these.

Suitably, the aqueous polymer formulation is applied onto at least part of the tribological surface of the first machine component at a temperature in the range of from 5-60° C. Step (a) can be carried out at a low pressure or a high pressure. Preferably, the aqueous polymer formulation is applied onto at least part of the tribological surface of the first machine component at a temperature in the range of from 10-40° C.

The polymer formulation provides an isocyanate which contains two or more isocyanate groups per molecule and an isocyanate-reactive polyol to form polyurethanes. The isocyanate-reactive polyol suitably provides of a polyol which contains one or more isocyanate-reactive groups. The polyol may also contain other reactive groups. Suitable polyols to be used in accordance with the present invention include 1,4-ethylene glycol, propylene glycol, diethylene glycol, neopentyl glycol, 1,4-butanediol, 1,6-hexanediol, furan dimethanol, cyclohexane dimethanol, glycerol, trimethylolpropan, dimethylol propanoic acid (DMPA), dimethylol butanoic acid (DMBA), polypropylene glycols, poly(propylene oxide/ethylene oxide) copolymers, polytetrahydrofuran, polybutadiene, hydrogenated polybutadiene, poysiloxane, polyamide polyesters, isocyanate-reactive polyoxyethylene compounds, polyester, polyether, polyether ester, polycaprolactone, polythioether, polycarbonate, polyethercarbonate, polyacetal and polyolefin polyols. Polyether polyols which may be used include products obtained by the polymerisation of a cyclic oxide, for example ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylopropane, pentaerythritol or Bisphenol A. Preferred polyether polyols include polyoxypropylene diols and triols, poly (oxyethylene-oxypropylene) diols and triols prepared by the simultaneous or sequential addition of ethylene and propylene oxides to appropriate initiators and polytetramethylene ether glycols obtained by the polymerisation of tetrahydrofuran.

Preferred polyols are acrylic polyols. Acrylic polyols are polyols which are obtained by radical copolymerisation of acrylic monomers (ternary or quaternary copolymers), such as acrylic or methacrylic acids and esters. The acrylic polyols may be obtained from the copolymerization of conventional acrylic monomers, such as ethyl acrylates (EA) or butyl acrylates (BA), acrylic acid (AA), methyl methacrylate (MMA), or styrene (ST) with hydroxylated acrylic monomers such as 2-hydroxyethyl acrylates (HEA) or 4-hydroxybutyl acrylates (HBA). The preferred acrylic polyols to be used is accordance with the present invention include hydroxyl functional polyacrylic dispersions such as Covestro'sA2695 and A2058.

In step (a), a mixture of two or more isocyantane-reactive polyols can be applied. For example, a mixture of one or more triols and one or more diols can be used. The weight average molecular weight of the isocyanate-reactive polyol is suitably in the range of from 500-6000 Daltons, preferably in the range of from 500-3000 Daltons.

The isocyanate to be used in accordance with the present invention contains two or more isocyanate groups per molecule. Hence, the isocyanate provides a di-isocyanate or a polyisocyanate. Preferably, the isocyanate provides a polyisocyanate. The polyisocyanates may be aliphatic, cycloaliphatic, aralyphatic, aromatic and/or polyisocyanates modified by the introduction of urethane, allophanate, urea, biuret, carbodiimide, uretonimine, urethdione or isocyanurate residues. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate, and 1,5-naphthylene diisocyanate. Preferred polyisocyanates are isophorone diisocyanate, 4,4'-dicyclohexylmethane diisocyanate, toluenediisocyanate and 4,4'-diphenylmethane diisocyanate.

Suitably, a mixture of two or more of any of the above-mentioned polyisocyanates can be used. It is also possible to use a mixture of an isocyanate which contains two or more isocyanate groups per molecular and one or more isocyanates that contain one isocyanate group per molecule.

The isocyanate that contains two or more isocyanate groups per molecule is suitably present in the aqueous polymer dispersion an amount in the range of from 15-60 wt %, preferably in an amount in the range of from 20-40 wt %, based on the total weight of the aqueous polymer dispersion.

The polymer formulation contains water in an amount in the range of from 10-60 wt %, preferably in the range of from 15-30 wt %, based on the total weight of the aqueous polymer formulation.

The polymer formulation may be an aqueous polymer dispersion (i.e. water-based polymer formulation) or a solvent-based polymer formulation. Preferably, the polymer formulation is an aqueous polymer dispersion.

Suitably, the solvent is a polar organic solvent. The polar solvent may be a polar aliphatic solvent or polar aromatic solvent, such as an alcohol, a ketone, ester, acetate, glycol ethers, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, or blends of aromatic hydrocarbons. Suitable alcohols include ethanol, isopropanol, n-butanol, and n-propanol. Suitable acetates include hexyl acetate, octyl acetate, and glycol ether acetates such as propylene glycol monomethyl ether acetate. Suitable ketones include methyl propyl ketone, methyl isobutyl ketone, and methyl hexyl ketone. Glycol ethers and glycol ether acetates are especially preferred. Further, the solvent may include non-polar aromatic and/or aliphatic solvents.

The aqueous polymer dispersion may contain in addition to the water a co-solvent which acts as a solvent with respect to both the isocyanate-reactive polyol and the isocyanate.

Hence, the present invention relates to process for preparing a coating on at least part of a tribological surface of a first machine component which, during machine operation, is adapted to be in sliding contact with the tribological surface of a second machine component, which process provides the steps of:

(a) applying an aqueous polymer dispersion onto at least part of the tribological surface of the first machine component to form a coating, which aqueous polymer dispersion provides an isocyanate that contains two or more isocyanate groups per molecule and an isocyanate-reactive polyol to form polyurethanes, and a co-solvent; and (b) subjecting at least part of the coating as obtained in step (a) to a curing treatment during which polyurethanes are formed in the coating on the at least part of the tribological surface of the first component component.

In one embodiment, the solvent is a polar organic solvent. The polar solvent may be a polar aliphatic solvent or polar aromatic solvent, such as an alcohol, a ketone, ester, acetate, glycol ethers, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, or blends of aromatic hydrocarbons. In another embodiment, the solvent is water or a mixture of water with small amounts of aqueous co-solvents. Suitable alcohols include ethanol, isopropanol, n-butanol, and n-propanol. Suitable acetates include hexyl acetate, octyl acetate, and glycol ether acetates such as propylene glycol monomethyl ether acetate. Suitable ketones include methyl propyl ketone, methyl isobutyl ketone, and methyl hexyl ketone. Glycol ethers and glycol ether acetates are especially preferred. Further, the solvent may include non-polar aromatic and/or aliphatic solvents.

The co-solvent is suitably present in the aqueous polymer dispersion in an amount up to 40 wt %, preferably in an amount of less than 20 wt %, based on the total weight of the aqueous polymer dispersion Preferably, the polymer formulation provides in addition particles of a filler material.

The present invention therefore also relates to process for preparing a coating on at least part of a tribological surface of a first machine component which, during machine operation, is adapted to be in sliding contact with a tribological surface of a second machine component, which process provides the steps of:

(a) applying a polymer formulation onto at least part of the tribological surface of the first machine component to form a coating, which polymer formulation provides an isocyanate that contains two or more isocyanate groups per molecule and an isocyanate-reactive polyol to form polyurethanes, and particles of a filler material; and (b) subjecting at least part of the coating as obtained in step (a) to a curing treatment during which polyurethanes are formed in the coating on the at least part of the tribological surface of the first machine component.

Such particles suitably have an average particle size of less than 10 microns, preferably less than 50 microns, more preferably less than 100 nm, and most preferably in the range of from 5-50 nm. These particles will be dispersed in the matrix of the polyurethane formed and will improve the wear resistance of the coating formed on the tribological surface of the first machine component.

The filler material of which the particles are made may be inorganic or organic. Preferably, the filler material is an inorganic filler material. Examples of suitable inorganic nanoparticles include metal oxides such aluminium oxide, silicon oxide, zinc oxide, iron oxide, titanium dioxide, tin oxide, indium oxide, zirconium dioxide, cerium oxide and mixtures thereof. Other suitable examples of filler materials include metal powders such as copper powders and nickel powders, and silicon carbides. Preferably, the filler material is a silicon oxide. Examples of suitable organic filler materials include for instance carbon nanoparticles.

The polyurethanes formed in step (b) of the process according to the present invention may be homopolymers of urethane or copolymers of urethane. Examples of suitable copolymers of urethane and an ether, copolymers of urethane and a carbonate, and copolymers of urethane and an acrylate. Preferably, the copolymer of urethane is a copolymer of urethane and an acrylate.

In accordance with the present invention the coating as obtained in step (b) suitably contains polyurethanes which contain a low surface tension group which is selected from the group consisting of a fatty acid chain having at least 6 carbon atoms, fluor-containing groups and silicon-containing groups. Suitably, the coating as obtained in step (b) has a surface energy of less than 35 mJ/m$^2$.

The silicon atom which is present in the silicon-containing group may be incorporated into the silicon-containing group by means of C—Si bond units, C—O—Si bond units or Si—O—Si bond units. The fluor-containing groups is suitably a fluorocarbon. Such a fluorocarbon suitably contains at least 4 fluorine atoms.

The low surface tension groups present in the polyurethanes will provide a very attractive low friction performance of the coating on the tribological surface of the first machine component.

Preferably, the polyurethanes in the coating contain one or more fluor-containing groups and/or one or more silicon-containing groups. Preferably, the polyurethanes in the coating contain one or more flour-containing groups and one or more silicon-containing groups.

The fluor-containing groups in the polyurethanes may suitably be derived from the isocyanate-reactive polyol. Suitably, the isocyanate-reactive polyols may therefore contain one or more fluor-containing groups and/or one or more silicon-containing groups. Preferably, the isocyanate-reactive polyols contain one or more fluor-containing groups and one or more silicon-containing groups.

In another embodiment of the present invention the fluor-containing groups in the polyurethanes may suitably be derived from the isocyanate that contains two or more isocyanate groups per molecule. Suitably, the isocyanates may therefore contain one or more fluor-containing groups and/or one or more silicon-containing groups. Preferably, the isocyanates contain one or more fluor-containing groups and one or more silicon-containing groups.

In a preferred embodiment, the fluor-containing groups that are present in the polyurethanes are derived from a compound which is present in the polymer formulation and which compound contains one or more fluor-containing groups.

Accordingly, the present invention relates to process for preparing a coating on at least part of a tribological surface of a first machine component which, during machine operation, is adapted to be in sliding contact with a tribological surface of a second machine component, which process provides the steps of:
(a) applying a polymer formulation onto at least part of the tribological surface of the first component to form a coating, which polymer formulation provides an isocyanate that contains two or more isocyanate groups per molecule and an isocyanate-reactive polyol to form polyurethanes, and a compound which contains one or more fluor-containing groups; and
(b) subjecting at least part of the coating as obtained in step (a) to a curing treatment during which polyurethanes are formed in the coating on the at least part of the tribological surface of the first machine component.

Preferably, the silicon-containing groups that are present in the polyurethanes are derived from a compound which is present in the aqueous polymer formulation and which compound contains one or more silicon-containing groups.

Accordingly, the present invention relates to process for preparing a coating on at least part of a tribological surface of a first machine component which, during machine operation, is adapted to be in sliding contact with a tribological surface of a second machine component, which process provides the steps of:
(a) applying a polymer formulation onto at least part of the tribological surface of the first machine component to form a coating, which polymer formulation provides an isocyanate that contains two or more isocyanate groups per molecule and an isocyanate-reactive polyol to form polyurethanes, a compound which contains one or more silicon-containing groups; and
(b) subjecting at least part of the coating as obtained in step (a) to a curing treatment during which polyurethanes are formed in the coating on the at least part of the tribological surface of the first machine component.

The present invention relates to process for preparing a coating on at least part of a tribological surface of a first machine component which, during machine operation, is adapted to be in sliding contact with a tribological surface of second machine component, which process provides the steps of:
(a) applying a polymer formulation onto at least part of the tribological surface of the first machine component to form a coating, which polymer formulation provides an isocyanate that contains two or more isocyanate groups per molecule and an isocyanate-reactive polyol to form polyurethanes, a compound which contains one or more fluor-containing groups and a compound contains one or more silicon-containing groups; and
(b) subjecting at least part of the coating as obtained in step (a) to a curing treatment during which polyurethanes are formed in the coating on the at least part of the tribological surface of the first machine component.

The silicon-containing compound which is preferably present in the aqueous polymer formulation is suitably a siloxane compound, preferably a polysiloxane. Examples of suitable silicon-containing compounds include trimethyl hydroxypropyl silane, heptamethyl hydroxypropyl trisiloxane and hydroxy functional silicone oils like polydimethylsiloxane carbonal terminated. The polysiloxane may be an acrylated polysiloxane. Suitable polysiloxanes include Tego Protect N5100 and Tego Glide 482 (both available from Evonik Industries AG); Byk-Silclean 3720 (available from Byk Additives & Instruments); and APS-216 (available from Adavanced Polymer Inc.).

Alternatively, the silicon-containing compound may be a silicone oil such as, for instance, a dimethyl silicone oil.

The polymer formulation may in addition contain a photo-initiator which will contribute to the forming of polyurethanes in the coating during the curing treatment in step (b) when the curing treatment is a UV treatment.

Accordingly, the present invention relates to process for preparing a coating on at least part of a tribological surface of a first machine component which, during machine operation, is adapted to be in sliding contact with a tribological surface of a second machine component, which process provides the steps of:
(a) applying a polymer formulation onto at least part of the tribological surface of the first machine component to form a coating, which polymer formulation provides an isocyanate that contains two or more isocyanate groups per molecule and an isocyanate-reactive polyol to form polyurethanes, and a photo-initiator; and
(b) subjecting at least part of the coating as obtained in step (a) to a curing treatment during which polyurethanes are formed in the coating on the at least part of the tribological surface of the first machine component.

Isobutyl benzoin ether is a suitable example of a commonly used free radical photo-initiator. A triarylsulfonium hexaflouroantimonate salt is a suitable example of commonly used as a cationic photo-initiator.

Typical photo-initiators to be used in accordance with the present invention may include, for example either a Type I photo-initiator or type II photo-initiator with a synergist. Examples of type I photoinitiators include □-hydroxy alkylphenols such a 1-hydroxycyclohexyl phenyl ethyl ketone), □-amino alkyl phenones and acyl phosphine oxides (for instance 'BAPO' phenylbis(2,4,6-trimethylbenzoyl)phosphorous oxide. Examples of Type II initiators include benzophenones such as 4-dimethylamino benzophenone, thioxanthones such as 2-isopropyl thioxanthone, with synergists that include, for example, ethyl-4-(dimethylamino) benzoate (known as EBD).

The UV treatment will cause the photo-initiators to generate free radicals and cationic particles which initiate the formation of cross-linking bonds among the isocyanate-reactive polyols and the isocyanate but also for instance a siloxane when present. Suitably, a mixture of different known photo-initiators can be used in accordance with the present invention.

A photo-initiator will suitably be present in an amount in the range of from 0.1-10 wt %, based on the total weight of the aqueous polymer formulation.

A catalyst can also suitably be present in the aqueous polymer formulation to be used in accordance with the present invention. The catalyst may catalyze a reaction between the isocyanate-reactive polyol and the isocyanate. In addition, the catalyst may also catalyze other reactions between polymerizable components that are present in the aqueous polymer formulation.

Accordingly, the present invention relates to process for preparing a coating on at least part of a tribological surface of a first machine component which, during machine operation, is adapted to be in sliding contact with a tribological surface of a second machine component, which process provides the steps of:
(a) applying a polymer formulation onto at least part of the tribological surface of the first component to form a coating, which polymer formulation provides an isocyanate that contains two or more isocyanate groups per molecule and an isocyanate-reactive polyol to form polyurethanes, and a catalyst; and
(b) subjecting at least part of the coating as obtained in step (a) to a curing treatment during which polyurethanes are formed in the coating on the at least part of the tribological surface of the first machine component.

Such polymerizable components may include the compound that contains one or more fluor-containing groups and/or one or more silicon-containing groups. Examples of suitable catalysts include catalysts selected from the group consisting of tin catalysts, acid catalysts, acid phosphates, aromatic acids, and combinations thereof. Specific examples of suitable tin catalysts include dibutyltin diacetate (DBTDA) and dibutyltin dilaurate (DBTDL). Specific examples of suitable acid catalysts include sulfonic acids including dodecylbenzene sulfonic acid (DDBSA), dinonylnapthalene sulfonic acid (DNNSA), dinonylnapthalene disulfonic acid (DNNDSA); and p-toluene sulfonamine (PTSA).

In step (b), at least part of the coating as obtained in step (a) is subjected to a curing treatment during which polyurethanes are formed in the coating on the at least part of the tribological surface of the first machine component. The curing can be established using heat or UV light.

In case the curing treatment in step (b) is a thermal treatment a temperature is applied in the range of from 50-200° C., preferably in the range of from 80-150° C. The thermal treatment can be carried out in manners known to the skilled person. Suitable thermal treatments include the use of a heat source directed at the coating to establish the formation of polyurethanes in the coating on the tribological surface of the first machine component. For instance, one or more heat sources can be located in the close vicinity of a spraying or other coating device by way of which the aqueous polymer formulation is applied onto the tribological surface.

In case a UV treatment is used as the curing treatment, UV light is used having a wavelength in the range of from 250-450 nm.

The UV treatment can be carried out in manners known to the skilled person. Suitable UV treatments include the use of UV lamps that radiate light waves of the desired wavelength into the coating to establish the formation of the polyurethanes in the coating on the tribological surface of the first machine component. For instance, one or more UV lamps can be located in the close vicinity of a spraying or other coating device by way of which the aqueous polymer formulation is applied onto the tribological surface.

The polymer formulation may suitably contain one or more additives such as a flow agent, a wetting agent and a slip or wetting agent.

Accordingly, the present invention relates to process for preparing a coating on at least part of a tribological surface of a first machine component which, during machine operation, is adapted to be in sliding contact with a tribological surface of a second machine component, which process provides the steps of:
(a) applying a polymer formulation onto at least part of the tribological surface of the first machine component to form a coating, which polymer formulation provides an isocyanate that contains two or more isocyanate groups per molecule and an isocyanate-reactive polyol to form polyurethanes, and a flow agent, a wetting agent and/or a slip or wetting agent; and
(b) subjecting at least part of the coating as obtained in step (a) to a curing treatment during which polyurethanes are formed in the coating on the at least part of the tribological surface of the first machine component.

A flow agent serves to enable good levelling of the coating, increase its uniformity and can also reduce the tendency for the surface to scratch. Examples of suitable flow agents include poly ethersiloxanes copolymers, polysiloxanes, and polyacrylates. Flow agents can suitably be present in the aqueous polymer formulation in an amount in the range of from 0.1-1 wt %, based on the total weight of the aqueous polymer formulation.

A wetting agent serves to improve interaction of the coating onto the substrate by modification of its surface energy at that interface and serves to increase adhesion to the substrate. Sometimes they may also offer improvement in flow properties. Examples of suitable wetting agents include anionic surfactants, cationic surfactants, non-ionic surfactants and poly ether siloxane copolymers. Wetting agents can suitably be present in the aqueous polymer formulation in an amount in the range of from 0.1-1 wt %, based on the total weight of the aqueous polymer formulation.

A slip, glide or anti-friction agent serves to lower the friction of the coating to another surface. Examples of suitable slip or friction agents include siloxanes, poly ether siloxane copolymers and organically modified siloxanes. Slip, glide or anti-friction agents can suitably be present in the aqueous polymer formulation in an amount in the range of from 0.1-12 wt %, based on the total weight of the aqueous polymer formulation.

The coating to be prepared with the process in accordance with the present invention has suitably a thickness in the range of from 1-100 microns, preferably in the range of from 5-30 microns.

One example of a suitable application for the coating, prepared in accordance with the invention, is depicted in FIG. 1, which shows a partial cross-section view of a bonded piston seal. In a typical automatic transmission, pistons displaced under fluid pressure are used to actuate clutch packs that in turn engage specific gears. The bonded piston seal converts hydraulic pressure into linear motion and is arranged in a cylinder of an automatic transmission housing.

The seal 1 has an essentially U-shaped annular metal body 2 and an inner lip 3 and an outer lip 4 which bear against an inner surface 15 of the housing 14. An outer peripheral section of the annular metal body provides a flange 4 that is in contact with a clutch plate arrangement 11. The seal arrangement further provides a balancer 8 mounted to the cylinder housing 14, which has a sealing lip 9 that bears against a radially oriented inner surface 7 of the annular metal body 2. A return spring 12 is arranged between axially oriented surfaces of the balancer 8 and the annular metal body 2.

When hydraulic fluid is introduced into a hydraulic chamber 16, pressure acts on the bonded piston seal 1, which is linearly displaced towards the balancer 8 and the clutch plate 11, to actuate the clutch plate. When hydraulic pressure is removed, the action of the return spring 12 causes the bonded piston seal to return to its starting piston. Thus, the bonded piston seal experiences reciprocating motion, whereby sliding contact occurs between the inner surface 15 of the housing 14 and contact surfaces of the inner and outer sealing lips 3, 4 of the bonded piston seal 1, and between the contact surface of the sealing lip 9 of the balancer 8 and the radially inner surface 7 of the annular metal body 2 of the bonded piston seal. In the depicted example, to reduce friction and wear of the sealing lips, 3, 4, 9, the contact surfaces of the inner and outer lips 3, 4 of the bonded piston seal 1 and the radially inner surface 7 of the annular metal body are provided with a coating in accordance with the invention.

The inner and outer lips 3, 4 are derived from an elastomeric material and a coating as described in Example 1 is provided on the contact surface of each lip. The same coating or a coating as described in Examples 3-7, 9 and 10 is provided on the radially inner surface 7 of the annular metal body.

Alternatively or additionally, the inner surface 15 of the housing 14 and the contact surface of the balancer seal lip 9 may be provided with the coating. A long service life of the bonded piston seal is thereby facilitated.

A coating prepared in accordance with the invention may also be used advantageously in rotary sealing applications.

Figure 2:
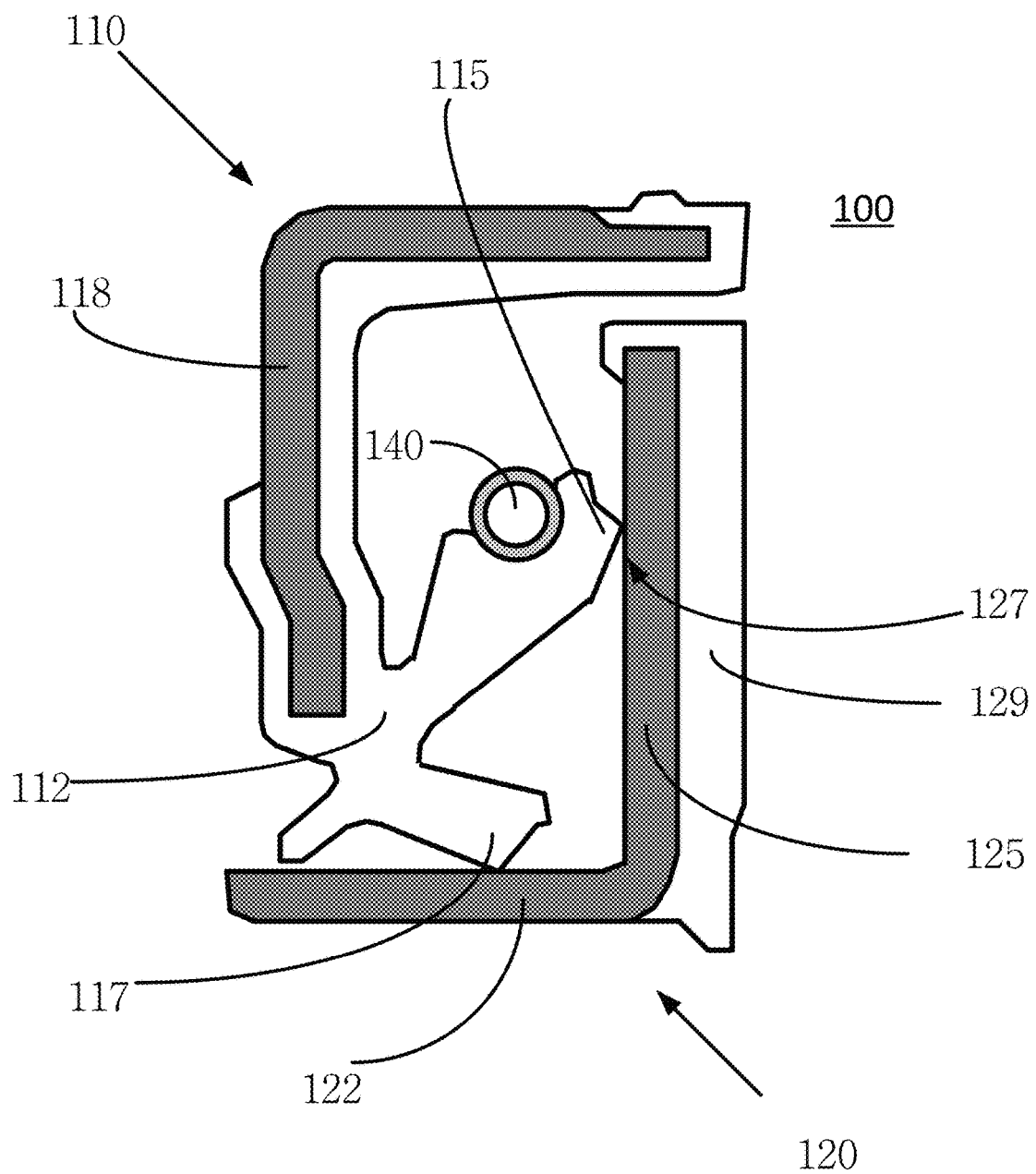
FIG. 2 is a part cross-sectional view of an example of a rotary seal provided with a coating in accordance with the invention.

FIG. 2 shows an example of a seal 100, which has a first part 110 comprising an elastomeric element 112 bonded to a metal casing element 118. A second part 120 of the seal consists of a flinger having a cylindrical part 122 and a radial flange part 125. The elastomeric element 112 has an axial sealing lip 115, which bears against an axially inner surface 127 of the radial flange part. This axially inner surface will be referred to as an axial counterface. The elastomeric element 112 of the first part also has a radial sealing lip 117 that bears against a radial counterface on the cylindrical part 122 of the flinger 120.

The seal shown in FIG. 2 is suitable for use in a wheel bearing unit adapted for inner ring rotation. Typically, the metal casing element 118 is mounted to a stationary outer ring of the bearing unit and the flinger 120 is mounted to a rotational inner ring. The main purpose of the seal is to protect the functionality of the bearing unit. The seal both retains lubricant within the bearing cavity and prevents the ingress of contaminants such as moisture and grit. The axial sealing lip 115 is particularly important for preventing the entry of contaminants and is therefore generally in tight contact with the axial counterface 127. To ensure that tight contact is maintained, the first part of the seal may further provide a garter spring 140.

Friction is therefore generated when the flinger 120 is rotating, due to the sliding contact between the axial lip 115 and the axial counterface 127. To reduce the friction and prevent wear of the axial lip 115, at least the axial counterface 127 is provided with a coating using the inventive process. Suitably, the radial counterface is also provided with the coating. The coating described in Example 5 is applied in the depicted embodiment, but any of the coatings described in the Examples may suitably be used.

In an alternative embodiment, the coating is provided on a contact surface of the axial lip 115 and of the radial lip 117.

Figure 3:
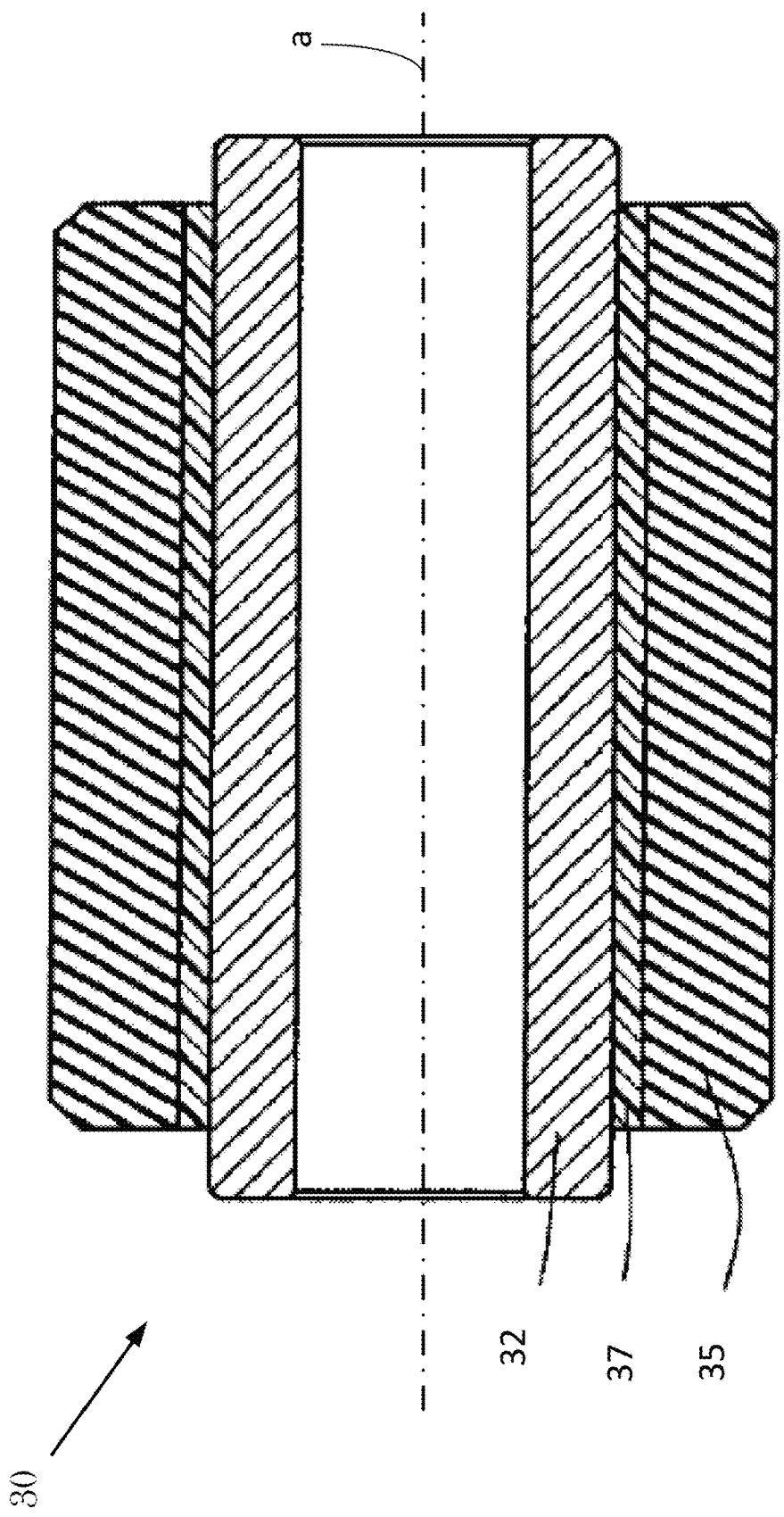
FIG. 3 is a cross-sectional view of an example of a plain bearing arrangement provided with a coating in accordance with the invention.

In addition to sealing applications, the coating of the invention may also be advantageously used to reduce friction in plain bearing arrangements. An example of a plain bearing arrangement is depicted in FIG. 3.

The arrangement 30 provides a shaft 32, which may be pivotable or rotatable about an axis a. The shaft is supported relative to a housing (not shown) by means of a bushing 35 made of a stiff polymeric material. In use, an outer surface of the shaft is in sliding contact with an inner surface of the bushing. To reduce friction, the inner surface of the bushing is provided with a coating, such as described in any of the Examples. The coating 37 has been depicted as a layer with a visible thickness, although, typically, has a thickness of around 30 microns.

In an alternative embodiment, the outer surface of the shaft or of a sleeve mounted to the shaft is provided with the coating.

Advantages of the invention will become apparent from the following examples.

EXAMPLES

Example 1

5.8 g of a polyisocyanate (Desmodur N3600, available from Covestro AG) was thoroughly mixed by stirring with 10.6 g ml of an acrylic polyol (Bayhydrol A2695, available from Covestro AG). 1.3 ml of a hydroxy polydimethylsiloxane dispersion (Tego Protect N5100, available from Evonik Industries AG) was then added and again mixed thoroughly into the other components for several minutes. Several drops (about 0.2% w/w formulation) of a wetting agent (Tego Wet 270, available from Evonik Industries AG) were also added and stirred into the formulation for several minutes. To this mixture 1 ml deionized water was added and mixed in by stirring to reduce the viscosity. The mixture was then left to stand for about 22 minutes. The aqueous polymer dispersion so obtained was then applied as a thin layer on a flat fluorocarbon rubber (FKM) elastomeric ring having a thickness of about 75 microns and left to dry gradually at room temperature over 24 hours, followed by treatment at 120° C. for 3 hours in a fan assisted oven. In this way, a thin translucent, flexible coating was produced on the FKM elastomeric ring.

The dynamic friction of the ring so obtained was then tested using a tribometer [CETR UMT-3] at 25° C. and at 0.2 MPa contact pressure against a lubricated steel counterface for a series of increasing rotational speeds at 0.025 m/s, 0.049 m/s, 0.12 m/s, 0.25 m/s, 0.49 m/s, 1.23 m/s, 2.47 m/s and 4.93 m/s for 30 seconds each. A fully synthetic engine oil was used for the experiment (Mobil Super 3000X1 5W30). This sequence was then run in reverse order to 0.049 m/s under the same conditions. Prior to testing for different speeds the sample was run in for several minutes at ambient and 0.2 MPa at 0.12 m/s. The experiment was repeated using the same sample for 50° C., 70° C. and 100° C.

Testing of the ring was repeated twice and friction with data measured between a duration of about 20 seconds of each test speed. An average of the coefficient of dynamic friction together with the range between the highest and lowest values was recorded.

For comparison reasons, a FKM elastomeric ring of identical dimensions without a coating according to the invention was tested and under the same conditions and with the same oil.

Coated FKM Elastomeric Ring (According to the Invention)

In accordance with the present invention, the following results were obtained.

For ascending contact speeds at 25° C. the average dynamic friction coefficient of the coated elastomer showed a minimum of 0.10 at 0.25 m/s and a maximum of 0.22 at 0.025 m/s in ascending contact speed. Descending contact speed showed similar behavior to ascending speed.

For ascending contact speeds at 50° C. the average dynamic friction coefficient of the coated elastomer showed a minimum of 0.14 at 0.49 m/s and a maximum of 0.16 at 0.049 m/s in ascending contact speed. Descending contact speed showed similar behavior to ascending speed.

For ascending contact speeds at 70° C. the average dynamic friction coefficient of the coated elastomer showed a minimum of 0.16 at 0.49 m/s and a maximum of 0.17 at 0.024 m/s in ascending contact speed. Descending contact speed showed similar behavior to ascending speed.

For ascending contact speeds at 100° C. the average dynamic friction coefficient of the coated elastomer showed a minimum of 0.16 at 1.23 m/s and a maximum of 0.17 at 0.049 m/s in ascending contact speed. Descending contact speed showed similar behavior to ascending speed.

Uncoated FKM Elastomeric Ring (not in Accordance with the Invention)

The following results were obtained.

For ascending contact speeds at 25° C. the average dynamic friction coefficient of the uncoated FKM elastomer showed a minimum of 0.32 at 0.25 m/s and a maximum of 0.43 at 0.025 m/s in ascending contact speed. Descending contact speed showed similar behavior to ascending speed.

For ascending contact speeds at 50° C. the average dynamic friction coefficient of the uncoated FKM elastomer showed a minimum of 0.31 at 4.93 m/s and a maximum of 0.40 at 0.025 m/s in ascending contact speed. Descending contact speed showed similar behavior to ascending speed.

For ascending contact speeds at 70° C. the average dynamic friction coefficient of the uncoated FKM elastomer showed a minimum of 0.30 at 4.93 m/s and a maximum of 0.44 at 0.025 m/s in ascending contact speed. Descending contact speed showed similar behavior to ascending speed.

For ascending contact speeds at 100° C. the average dynamic friction coefficient of the uncoated FKM elastomer showed a minimum of 0.30 at 4.93 m/s and a maximum of 0.42 between 0.025-0.049 m/s in ascending contact speed. Descending contact speed showed similar behavior to ascending speed.

Example 2

The same aqueous polymer dispersion as used in Example 1 was coated onto a nitrile butadiene rubber (NBR) elastomeric ring of the same dimensions. The ring was tested in dry lubrication conditions.

Dynamic friction in dry conditions was measured using a tribometer [CETR UMT-3] at 25° C. against a steel counterface at 0.2 MPa contact pressure for a series of increasing rotational speeds at 0.16 mm/s, 0.25 mm/s, 0.49 mm/s, 0.86 mm/s, 1.6 mm/s, 2.5 mm/s, 4.9 mm/s, 8.6 mm/s, 16 mm/s, 25 mm/s, 49 mm/s and 99 mm/s. Temperature was maintained at 25° C.

For comparison reasons, a NBR elastomeric ring of identical dimensions without a coating was tested and under the same conditions.

Coated NBR Elastomeric Ring (According to the Invention)

A minimum dynamic friction coefficient of 0.10 was recorded at 0.86 mm/s with a maximum of 0.16 at 99 mm/s.

Uncoated NBR Elastomeric Ring (not in Accordance with the Invention)

A minimum dynamic friction coefficient of 0.48 was recorded at 0.16 mm/s with a maximum of 1.51 at 99 mm/s.

Example 3

10.6 g of an acrylic polyol (Bayhydrol A2695, available from Covestro AG) was added to 2 ml acetone (99%) and mixed together for several minutes by stirring. 3 ml of a nano-silica (Tego Nanopol C764, available from Evonik Industries AG) was then added as a 50 wt % formulation in an acetate and mixed in thoroughly. Several drops (about 0.2% w/w formulation) of a wetting agent (Tego Wet 270, available from Evonik Industries AG) were added and stirred into the formulation, after which a hydroxy polydimethylsiloxane dispersion 1.3 ml of Tego Protect N5100 (available from Evonik Industries AG) was then added and mixed thoroughly into the other components for several minutes. 5.8 g of a polyisocyanate (Desmodur N3600, available from Covestro AG) was then added and mixed, after which 1.0 ml of deionized water was finally added and mixed into the formulation. The mixture was then left to stand for about 22 minutes to allow air bubbles to leave the aqueous polymer dispersion so obtained.

The aqueous polymer dispersion was then applied as a thin layer on a flat fluorocarbon (FKM) elastomeric ring at about 75 microns thickness and left to dry gradually at room temperature over 24 hours, followed by treatment at 120° C. for 3 hours in a fan assisted oven. In this way, a thin transluscent, flexible coating was produced on the FKM elastomeric ring.

Dynamic friction in dry conditions was measured using a tribometer [CETR UMT-3] at 25° C. against a steel counterface at 0.2 MPa contact pressure for a series of increasing rotational speeds at 0.16 mm/s, 0.25 mm/s, 0.49 mm/s, 0.86 mm/s, 1.6 mm/s, 2.5 mm/s, 4.9 mm/s, 8.6 mm/s, 16 mm/s, 25 mm/s, 49 mm/s and 99 mm/s. Temperature was maintained at 25° C.

For comparison reasons, a FKM elastomeric ring of identical dimensions without a coating was tested under the same conditions.

Coated FKM Elastomeric Ring (According to the Invention)

A minimum dynamic friction coefficient of 0.09 was recorded at 0.16 mm/s with a maximum of 0.18 at 99 mm/s.

Uncoated FKM Elastomeric Ring (not in Accordance with the Invention)

A minimum dynamic friction coefficient of 0.27 was recorded at 0.16 mm/s with a maximum of 0.78 at 99 mm/s.

Example 4

5.8 g of a polyisocyanate (Desmodur N3600, available from Covestro AG) was mixed with 10.6 g of an acrylic polyol (Bayhydrol A2695, available from Covestro AG) and mixed thoroughly by stirring. To this mixture 1 ml of deionized water was added and mixed in by stirring to reduce the viscosity. The mixture was then left to stand for about 22 minutes.

The aqueous polymer dispersion so obtained was then applied as a thin layer on a flat fluorocarbon (FKM) elastomeric ring at about 75 microns thickness and left to dry gradually at room temperature over 24 hours, followed by treatment at 120° C. for 3 hours in a fan assisted oven. In this way, a tough, well adhered coating was produced on the FKM elastomeric ring.

From the results in the above Examples, it will be clear that the present invention constitutes a considerable improvement in terms of friction reduction when compared with a conventional uncoated elastomeric ring.

Example 5

10.6 g of an acrylic polyol (Bayhydrol A2695, available from Covestro AG) was added to 2 ml acetone (99%) and mixed together for several minutes by stirring. 3.0 ml of a nano-silica (Tego Nanopol C764, available from Evonik Industries AG) was then added and mixed in thoroughly. 1.3 ml of the hydroxy polydimethylsiloxane formulation Tego Protect N5100 (available from Evonik Industries AG) was then added and mixed thoroughly into the other components for several minutes. 5.8 g of a polyisocyanate (Desmodur N3600, available from Covestro AG) was then added and mixed, after which 1.0 ml of deionized water was finally added and thoroughly mixed into the formulation. The mixture was then left to stand for about 20 minutes to allow air bubbles to leave the aqueous polymer dispersion so obtained.

The aqueous polymer dispersion was then applied as a thin layer on a flat steel substrate at approximately 75 microns thickness and left to dry gradually at room temperature over 24 hours, followed by treatment at 120° C. for 3 hours in a fan assisted oven. In this way a thin, translucent coating was produced on the steel.

Dynamic friction in dry conditions was measured using a tribometer [CETR UMT-3] at 25° C. against a flat nylon 6,6 test ring at approximately 9 MPa contact pressure for a series of increasing rotational speeds at 0.16 mm/s, 0.25 mm/s, 0.49 mm/s, 0.86 mm/s, 1.6 mm/s, 2.5 mm/s, 4.9 mm/s, 8.6 mm/s, 16 mm/s, 25 mm/s, 49 mm/s and 99 mm/s. Temperature was maintained at 25° C.

The coated steel surface as prepared above was tested and a minimum dynamic friction coefficient of 0.09 was recorded at 8.6 mm/s with a maximum of 0.11 at 0.16 mm/s.

Example 6

5.8 g of a polyisocyanate (Desmodur N3600, available from Covestro AG) was thoroughly mixed by stirring with 10.6 g of an acrylic polyol (Bayhydrol A2695, available from Covestro AG). 1.3 ml of a hydroxy polydimethylsiloxane formulation (Tego Protect N5100, available from Evonik Industries AG) was then added and again mixed thoroughly into the other components for several minutes. To this mixture 1 ml deionized water was added and mixed in by stirring to reduce the viscosity. The mixture was then left to stand for 20 minutes The aqueous polymer dispersion so obtained was then applied as a thin layer on a flat steel substrate at approximately 75 microns thickness and left to dry gradually at room temperature over 24 hours, followed by treatment at 120° C. for 3 hours in a fan assisted oven. In this way a thin, translucent coating was produced on the steel.

Dynamic friction in dry conditions was measured using a tribometer [CETR UMT-3] at 25° C. against a flat nylon 6,6 test ring at approximately 9 MPa contact pressure for a series of increasing rotational speeds at 0.16 mm/s, 0.25 mm/s, 0.49 mm/s, 0.86 mm/s, 1.6 mm/s, 2.5 mm/s, 4.9 mm/s, 8.6 mm/s, 16 mm/s, 25 mm/s, 49 mm/s and 99 mm/s. Temperature was maintained at 25° C.

The coated steel surface as prepared in this Example was tested and a minimum dynamic friction coefficient of 0.08 was recorded at 8.6 mm/s with a maximum of 0.10 at 99 mm/s.

Example 7

5.8 g of a polyisocyanate (Desmodur N3600, available from Covestro AG) was thoroughly mixed by stirring with 10.6 g of an acrylic polyol (Bayhydrol A2695, available from Covestro AG). 1.3 ml of a hydroxy polydimethylsiloxane formulation (Tego Protect N5100, available from Evonik Industries AG) was then added and again mixed thoroughly into the other components for several minutes. To this mixture 1 ml deionized water was added and mixed in by stirring to reduce the viscosity. The mixture was then left to stand for 20 minutes The aqueous polymer dispersion so obtained was then applied as a thin layer on a flat steel substrate at approximately 75 microns thickness and left to dry gradually at room temperature over 24 hours, followed by treatment at 120° C. for 3 hours in a fan assisted oven. In this way a thin, translucent coating was produced on the steel.

The formulation was also applied onto a flat steel test ring in a similar way and polymerised using the same conditions.

The dynamic friction of the two surfaces was then tested using a tribometer [CETR UMT-3] at 25° C. at approximately a range of contact pressures from 0.9 MPa to 9 MPa with rotational speed maintained at 99 mm/s. Temperature was maintained at 25° C.

The coated steel surface as prepared in this Example was tested and a minimum dynamic friction coefficient of 0.05 was recorded at 9 MPa with a maximum of 0.07 at 0.9 MPa.

Example 8

A thin coating of the polyurethane acrylate formulation coating as made in Example 5 was made on a steel ring having a 5 cm outer diameter and 3 cm internal diameter.

A Mini Traction Machine (MTM2, PCS Instruments) was used to determine the traction friction coefficient of the polyurethane acrylate formulation coating using a ball on disc arrangement. An uncoated steel ball was used with a contact pressure of 750 MPa, a slide-roll ratio of approximately 5%, maintained at 90° C. under oil lubricated conditions (Tribol 1510 used). The rolling speed was increased from 50 to 700 mm/s.

An average traction coefficient of less than 0.01 was achieved across 100 to 600 mm/s. This was repeated using a newly prepared coating on a ring, which gave similar results.

A reference test of an uncoated steel ring against the ball was carried out for comparative reasons, using identical test conditions, and gave a traction friction coefficient between 0.03 and 0.04 under the same speed range.

Example 9

0.15 g of the type I photoinitiator 1-Hydroxy-cyclohexyl phenyl ketone was added to 10.0 g of a UV curable aqueous polyurethane dispersion (Bayhydrol UV XP2690, Covestro AG) and mixed until the initiator was fully dissolved into the dispersion. The mixture was then coated onto an NBR elastomer ring (~5 cm diameter) and dried at 50° C. for several hours to remove water and solvent from the formulation. The resulting film was then exposed to UV radiation using a single pass under an iron doped mercury lamp (F300 lamp with D-bulb, FusionUV Inc.) at 4 meters per minute, which produced a solid coating on the ring ~50 microns thickness.

Dynamic friction in dry conditions was measured using a tribometer [CETR UMT-3] at 25° C., 37° C. and 55° C. against a steel counter-face at 0.2 MPa contact pressure for a series of increasing rotational speeds at 0.16 mm/s, 0.25 mm/s, 0.49 mm/s, 0.86 mm/s, 1.6 mm/s, 2.5 mm/s, 4.9 mm/s, 8.6 mm/s, 16 mm/s, 25 mm/s, 49 mm/s and 99 mm/s. Temperature was maintained at 25° C.

An NBR reference sample of identical dimensions without a coating was tested and under the same conditions.

At 25° C. minimum dynamic friction coefficient of 0.24 was recorded at 0.16 mm/s with a maximum of 0.42 at 99 mm/s for the coated NBR elastomer.

At 37° C. minimum dynamic friction coefficient of 0.22 was recorded at 0.16 mm/s with a maximum of 0.49 at 99 mm/s for the coated NBR elastomer.

At 55° C. minimum dynamic friction coefficient of 0.19 was recorded at 0.16 mm/s with a maximum of 0.64 at 99 mm/s for the coated NBR elastomer.

Example 10

6.33 g of a polyisocyanate (Desmodur N3900, Covestro AG) was thoroughly mixed into 11.0 g of acrylic polyol (Bayhydrol 2058, Covestro AG), followed by the dropwise addition of 2.6 g of a perfluorinated aqueous polyurethane dispersion (P56, Solvay-Solexis S.p.A) with constant stirring. Mixing was maintained for a further 5 minutes and with the dispersion left still for at least 30 minutes.

The dispersion was then applied as a thin layer on a circular, flat steel substrate at approximately 75 microns thickness and left to dry gradually at room temperature over 24 hours, followed by treatment at 120° C. for 3 hours in a fan assisted oven. In this way a very smooth, translucent coating was produced on the steel.

The sample was then tested using a pin-on-disc tribometer (Microtest S.A.) using a 12.7 mm diameter steel ball, 1N loading at a contact speed of 1 m/minute with a test duration of one hour. Friction values between approximately 0.23 and 0.30 were attained with higher friction observed at the end of testing.

From the results in the above Examples 1-10 it will be clear that the present invention provides mechanical components which show attractive low friction performances. The results of Examples 1-7, 9 and 10 show attractive low-friction performance under conditions of sliding contact, while the results of Example 8 show that a beneficial effect can also be achieved under conditions of rolling contact.

The invention claimed is:

1. A process for preparing a coating on at least part of a tribological surface of a first machine component composed of nitrile butadiene rubber, styrene butadiene rubber or fluorocarbon rubber which, during machine operation, is adapted to be in sliding contact with a tribological surface of a second machine component, the process comprises:
    (a) applying an aqueous polymer formulation onto at least part of the tribological surface of the first machine component to form a coating, the aqueous polymer formulation comprising a polyisocyanate and an acrylic polyol to form polyurethanes; and
    (b) subjecting at least part of the coating as obtained in step (a) to a curing treatment during which the polyurethanes are formed in the coating on the at least part of the tribological surface of the first machine component;
    wherein the acrylic polyol is the only polyol in the aqueous polymer formulation;
    the acrylic polyol has a weight average molecular weight of 500-3000 Daltons and is obtained by copolymerizing an acrylic monomer with a hydroxylated acrylic monomer;
    the acrylic monomer is selected from the group consisting of ethyl acrylates (EA), butyl acrylates (BA), acrylic acid (AA), methyl methacrylate (MMA) and styrene (ST); and
    the hydroxylated acrylic monomer is selected from the group consisting of 2-hydroxyethyl acrylates (HEA) and 4-hydroxybutyl acrylates (HBA).

2. The process according to claim 1, wherein the polymer formulation further comprises a hydroxy polydimethylsiloxane dispersion.

3. The process according to claim 1, wherein the aqueous polymer formulation further comprises particles of a filler material which particles have an average particle size of less than 100 nm.

4. The process according to claim 1, wherein the curing treatment in step (b) is a thermal treatment carried out at a temperature in the range of from 50-250° C.

5. A machine component on which a coating is formed using a process for preparing a coating on at least part of a tribological surface of a first machine component composed of nitrile butadiene rubber, styrene butadiene rubber or fluorocarbon rubber which, during machine operation, is adapted to be in sliding contact with a tribological surface of a second machine component, the process comprises:
   (a) applying an aqueous polymer formulation onto at least part of the tribological surface of the first machine component to form a coating, the aqueous polymer formulation comprising a polyisocyanate and an acrylic polyol to form polyurethanes; and
   (b) subjecting at least part of the coating as obtained in step (a) to a curing treatment during which the polyurethanes are formed in the coating on the at least part of the tribological surface of the first machine component;
   wherein the acrylic polyol is the only polyol in the aqueous polymer formulation;
   the acrylic polyol has a weight average molecular weight of 500-3000 Daltons and is obtained by copolymerizing an acrylic monomer with a hydroxylated acrylic monomer;
   the acrylic monomer is selected from the group consisting of ethyl acrylates (EA), butyl acrylates (BA), acrylic acid (AA), methyl methacrylate (MMA) and styrene (ST); and
   the hydroxylated acrylic monomer is selected from the group consisting of 2-hydroxyethyl acrylates (HEA) and 4-hydroxybutyl acrylates (HBA).

6. The process according to claim 1, wherein the aqueous polymer dispersion contains water in an amount in the range of 0-60 wt % based on the total weight of the aqueous polymer formulation.

7. The process according to claim 6, wherein the polyisocyanate is selected from the group consisting of isophorone diisocyanate, 4,4'-dicyclohexylmethane diisocyanate, toluenediisocyanate and 4,4'-diphenylmethane diisocyanate.

8. The process according to claim 7, wherein the aqueous polymer dispersion contains the polyisocyanate in an amount in the range of 20-40 wt % based on the total weight of the aqueous polymer formulation.

9. The process according to claim 8, wherein the aqueous polymer formulation further comprises a polysiloxane.

10. The process according to claim 8, wherein the aqueous polymer formulation further comprises a hydroxy polydimethylsiloxane dispersion.

11. The process according to claim 10, wherein the aqueous polymer formulation further comprises silicon oxide particles having an average particle size of less than 100 nm.

12. The process according to claim 11, wherein the aqueous polymer formulation further comprises a wetting agent in an amount in the range of 0.1-1 wt % based on the total weight of the aqueous polymer formulation.

13. The process according to claim 1, wherein:
   the aqueous polymer formulation consists of the polyisocyanate, the acrylic polyol and water.

14. The process according to claim 1, wherein:
   the aqueous polymer formulation consists of the polyisocyanate, the acrylic polyol, a hydroxy-functional polydimethyl siloxane, a wetting agent and water.

15. The process according to claim 1, wherein:
   the aqueous polymer formulation consists of the polyisocyanate, the acrylic polyol, a hydroxy-functional polydimethyl siloxane, a wetting agent, silicon oxide particles having an average particle size of less than 100 nm, acetone, an acetate and water.

16. The machine component according to claim 5, wherein the aqueous polymer formulation consists of the polyisocyanate, the acrylic polyol and water.

17. The machine component according to claim 5, wherein the aqueous polymer formulation consists of the polyisocyanate, the acrylic polyol, a hydroxy-functional polydimethyl siloxane, a wetting agent and water.

18. The machine component according to claim 5, wherein the aqueous polymer formulation consists of the polyisocyanate, the acrylic polyol, a hydroxy-functional polydimethyl siloxane, a wetting agent, silicon oxide particles having an average particle size of less than 100 nm, acetone, an acetate and water.

19. The machine component according to claim 5, wherein the aqueous polymer formulation further comprises:
   a hydroxy polydimethylsiloxane dispersion; and
   silicon oxide particles having an average particle size of less than 100 nm.

20. The machine component according to claim 19, wherein the polyisocyanate is selected from the group consisting of isophorone diisocyanate, 4,4'-dicyclohexylmethane diisocyanate, toluenediisocyanate and 4,4'-diphenylmethane diisocyanate.

* * * * *